(12) United States Patent
Feng

(10) Patent No.: US 7,142,734 B1
(45) Date of Patent: Nov. 28, 2006

(54) 2D IMAGING DATA COLLECTION SENSOR WITH MATCHING ILLUMINATOR

(75) Inventor: Chen Feng, Bothell, WA (US)

(73) Assignee: MagnaChip Semiconductor, Inc., Santa Clara, CA (US)

( * ) Notice: Subject to any disclaimer, the term of this patent is extended or adjusted under 35 U.S.C. 154(b) by 583 days.

(21) Appl. No.: 10/026,094

(22) Filed: Dec. 21, 2001

(51) Int. Cl.
G06K 7/00 (2006.01)

(52) U.S. Cl. .................. 382/312; 382/313; 382/317; 382/318

(58) Field of Classification Search .......... 235/462.52, 235/462.01, 462.15, 462.25, 462.1; 250/234, 250/208.1, 227.21; 359/852; 382/312, 313, 382/317, 318; 600/427; 434/22; 362/296, 362/298
See application file for complete search history.

(56) References Cited

U.S. PATENT DOCUMENTS

| | | | |
|---|---|---|---|
| 4,065,860 A * | 1/1978 | Linton et al. | 434/22 |
| 4,591,960 A * | 5/1986 | Jones | 362/298 |
| 4,683,474 A * | 7/1987 | Randig | 342/368 |
| 5,198,648 A * | 3/1993 | Hibbard | 235/462.24 |
| 5,777,314 A * | 7/1998 | Roustaei | 235/462.42 |
| 5,800,050 A * | 9/1998 | Leadford | 362/296 |
| 5,965,863 A * | 10/1999 | Parker et al. | 235/462.25 |
| 6,075,240 A * | 6/2000 | Watanabe et al. | 250/234 |
| 6,264,105 B1 * | 7/2001 | Longacre et al. | 235/462.1 |
| 6,285,902 B1 * | 9/2001 | Kienzle et al. | 600/427 |
| 6,655,595 B1 * | 12/2003 | Longacre et al. | 235/462.1 |

FOREIGN PATENT DOCUMENTS

| | | | |
|---|---|---|---|
| JP | 407094697 A * | 4/1995 | |
| JP | 409265880 A * | 10/1997 | |

* cited by examiner

*Primary Examiner*—Anh Hong Do
(74) *Attorney, Agent, or Firm*—Greenberg Traurig, LLP

(57) ABSTRACT

A 2D imaging data collection sensor with matching illuminator. The illuminator comprises an array of light emitting reflectors projecting an illumination pattern onto a target area containing an image to be read. The illumination pattern both serves as visual aiming assistance and provides target illumination. The shape of the projected illumination pattern is generated by an array of reflectors, reflecting light that emanates from an array of light sources. The shape of the individual reflectors, and the arrangement of the reflectors and light sources produce the desired uniformity and shape of the illumination pattern. The target image is sensed by an image sensor, and a micro-controller performs all sensor-setting, image capture, feature extraction, and decoding. Results are sent to a PC via a serial communication port.

10 Claims, 6 Drawing Sheets

US 7,142,734 B1

2D IMAGING DATA COLLECTION SENSOR WITH MATCHING ILLUMINATOR

FIELD OF INVENTION

The invention relates to the field of portable data collection, and more particularly, to a portable data collection device casting an illumination pattern, wherein the illumination pattern both serves as visual aiming assistance and provides target image illumination.

BACKGROUND OF INVENTION 2D imaging portable data collection devices are used in manufacturing, service and packet delivery industries to perform a variety of data collection activities. Such devices are equipped with an illuminator, providing illumination for the target image, and with a separate aiming pattern generator, producing aiming patterns such as dots, cross-hairs, or corners.

Single dot patterns cannot indicate the effective field-of-view, while cross-hair and frame patterns produced by lasers raise the concern of laser radiation. Furthermore, to prevent the generated aiming pattern from interfering with the reading of the target image, the aiming pattern and the image illumination need to be alternately turned on and off. In addition, the above aiming patterns are often off the axis with the imaging lens, introducing imaging errors. A need exists for a 2D imaging data collection device which solves these problems.

SUMMARY OF INVENTION

The present invention describes a system and method for 2D imaging data collection with matching illuminator.

In one embodiment of the present invention, an array of reflectors is used to reflect light emanating from an array of light sources onto a target image, in the form of an illumination pattern. The illumination pattern both serves as visual aiming assistance and provides target image illumination. The shape of the individual reflectors, as well as the arrangement of the reflectors and light sources, produce the particular uniformity and shape of the illumination pattern. An image sensor senses light reflected back by the target image. The image undergoes capture, processing, feature-extraction, and decoding. Results are optionally sent to an external device, such as a PC, or stored internally.

DETAILED DESCRIPTION OF PREFERRED EMBODIMENT(S)

Figure 1:
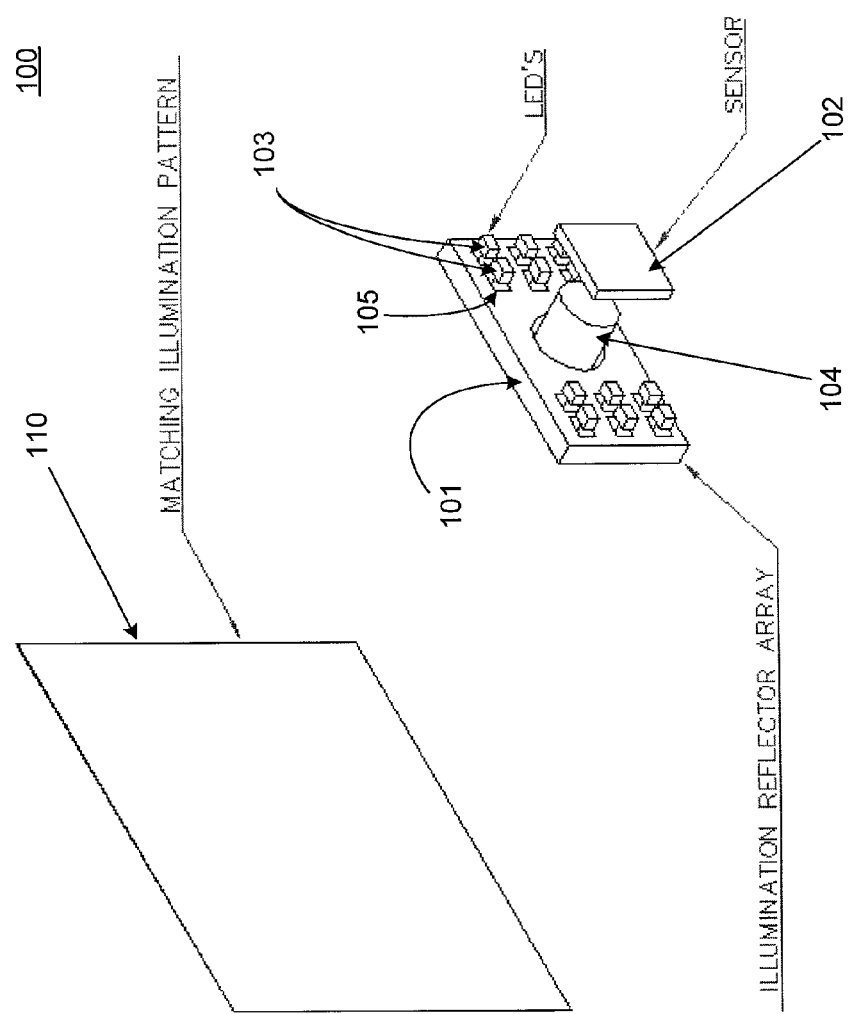
FIG. 1 provides a perspective illustration of a 2D imaging data collection sensor with matching illuminator, in accordance with the principles of this invention.

FIG. 1 shows a perspective diagram of a 2D imaging data collection sensor 100 with matching illuminator provided in accordance with the principles of this invention.

In the preferred embodiment, 2D imaging sensor 100 comprises one or more light source elements 103 behind a reflector array 101 comprising a corresponding array of reflectors 105. In this embodiment, light sources 103 are arranged in an array to correspond with reflector array 101, with a light source element 103 for each reflector 105. Light source 103 comprises a light emitting element, such as a light emitting diode (LED), or other like lighting element.

In operation, light emanating from light source 103 is reflected by the plurality of reflector 105 in the reflector array 101 to collectively project an illumination pattern 110 onto a target image area. Light sources 103 and the plurality of reflectors 105 may be selectively pre-arranged to produce one or more variety of resulting shapes and uniformities in the illumination pattern 110. Optionally, illumination pattern 110 may be turned off to facilitate reading an image that does not require illumination, such as a target image on a back-lit, self-illuminating medium, for example, on a liquid crystal display (LCD).

Light reflected back from the target area travels through an imaging lens 104 and is received by an image sensor 102. Illumination pattern 110 also provides aiming assistance via the shape of the illumination pattern 110 that indicates a visual guide to properly position the target area for optimum imaging by the image sensor. Guiding the user to properly place the target image area within the illumination pattern 101 results in proper sensing of the image by the image sensor 102. Preferably, image sensor 102 comprises a single imaging chip for optimal compactness. Accordingly, 2D imaging data collection sensor 100 projects an illumination pattern 110 that integrates both target image illumination as well as a visual aiming assistance means.

Figure 2:
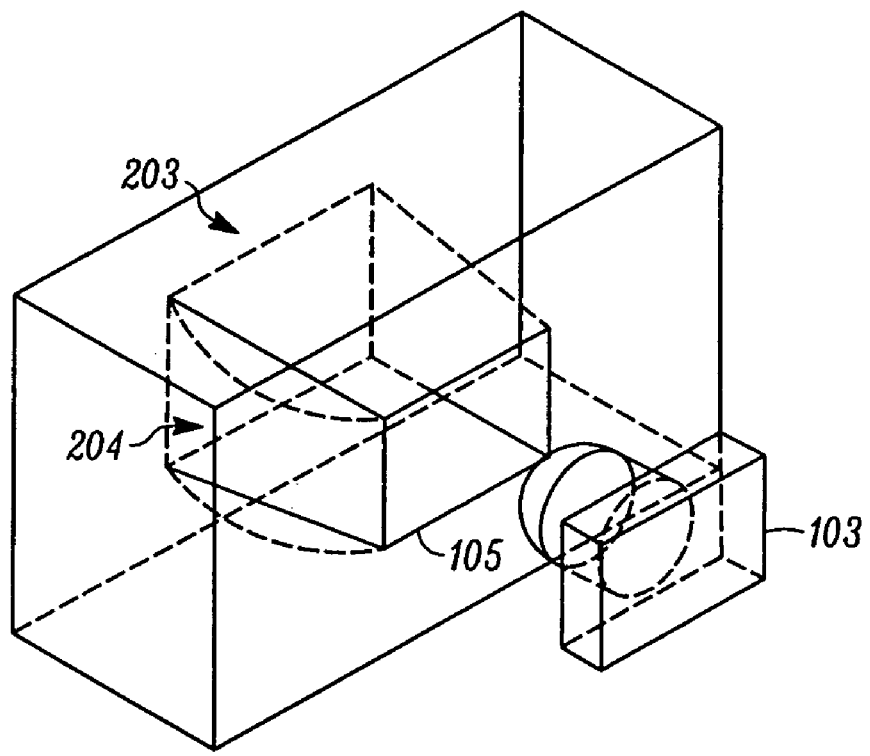
FIG. 2. provides a more detailed illustration of the light source and reflector of FIG. 1.

FIG. 2 provides a more detailed illustration of a light source 103 and a matching reflector 105. Reflector 105 comprises a surface area 204 shaped to directionally reflect light emanating from light source 103. An aperture 203 shaped by surface area 204 allows light reflected from surface 204 to exit reflector 105 in such manner as to produce a uniformly illuminated pattern 110 with sharp edges. In one embodiment, opening 203 comprises a rectangle, and surface 204 of reflector 105 is curved to produce a uniform and rectangular illumination pattern 110. However, it is contemplated that aperture 203 and surface 204 of reflector 105 may be alternatively shaped to produce other illumination pattern 110 that is non-uniform, or which comprises a different shape, such as a circle, an oval, a square, or other shapes and polygons.

In the preferred embodiment, reflector array 101 comprises a reflective material, such as metal, or other reflective metallic or synthetic material with reflective coating, with each aperture 203 in array 101 formed in effect by surface area 204 of each reflector 105. Alternatively, in another embodiment, each reflector 105 comprises a solid of a transparent material, such as acrylic, to reflect entering light with its internal surfaces utilizing the total internal reflection without requiring reflective coating. In such an embodiment, reflectors 105 are mounted on a supporting frame to form reflector array 101.

Figure 3:
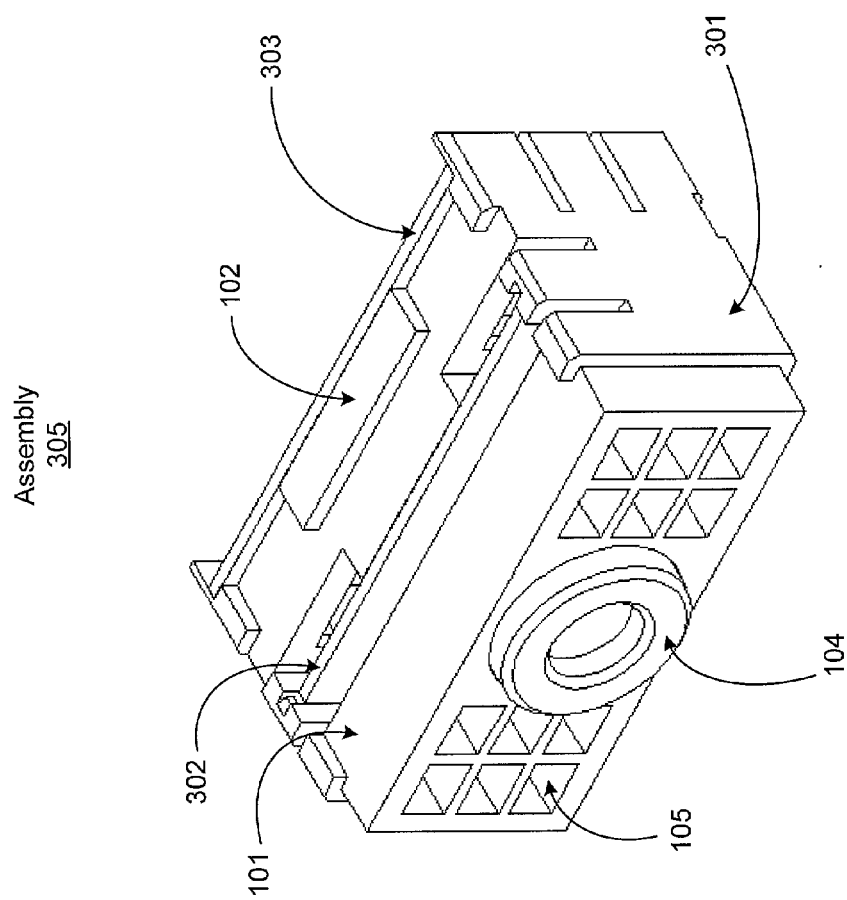
FIG. 3. illustrates one embodiment of an assembled 2D imaging data collection sensor of FIG. 1.
Figure 4:
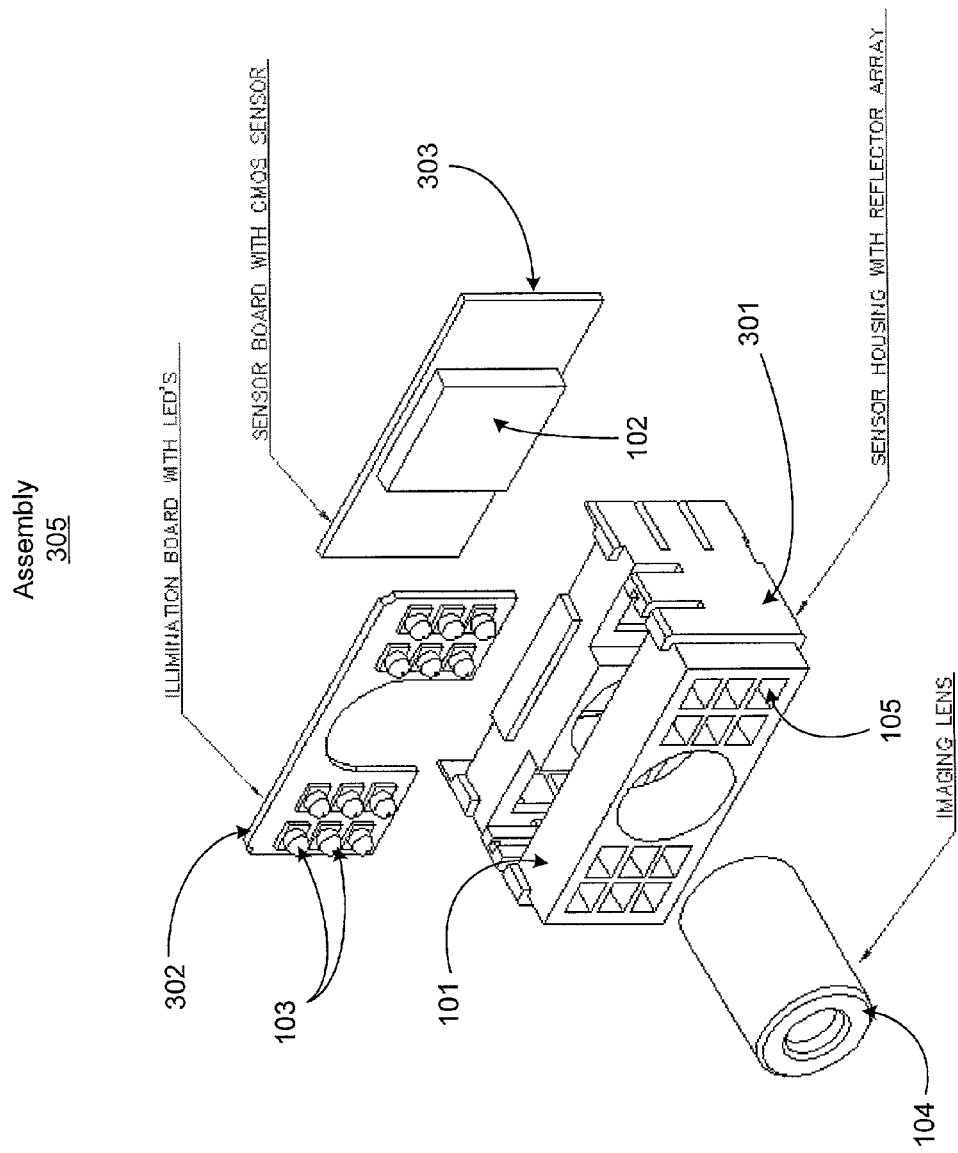
FIG. 4. provides an exploded view of the assembled 2D imaging data collection sensor of FIG. 3.
Figure 5:
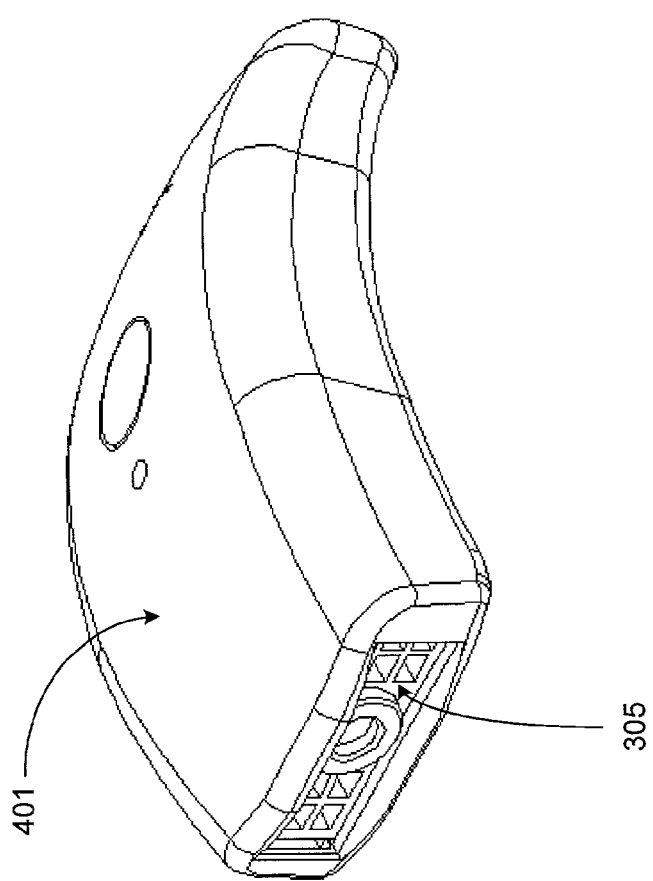
FIG. 5. provides an illustration of a sample housing encasing the 2D imaging data collection sensor of FIG. 3.

FIGS. 3–5 illustrate a sample embodiment of an assembled 2D imaging data collection sensor and a sample embodiment of its housing implementation. FIG. 3 shows one embodiment of an assembled 2D imaging data collection sensor of FIG. 1, and FIG. 4 shows an exploded view of the assembled 2D imaging data collection sensor shown in FIG. 3. FIG. 5 depicts a sample housing 401 encasing assembly 305 of FIGS. 3 and 4.

The exploded view in FIG. 4 shows the placement of the various components of the 2D imaging data collection sensor of FIG. 1 assembled in one embodiment of sensor housing 301. Light sources 103 are mounted preferably on an illumination board 302, while image sensor 102 is mounted on a sensor board 303. Illumination board 302 is placed behind reflector array 101, with reflector array 101, illumination board 302, and housing 301 each shaped to provide an aperture to fit an imaging lens 104 in housing 301.

In a preferred embodiment, sensor board 303 also houses a micro-controller, which performs all sensor-setting, image capturing, feature extraction and decoding. Alternatively, the micro-controller resides on a separate board outside of the sensor board 303. The results of the image processing may be sent to an external device, such as a personal computer (PC), or alternatively, to an internal module, such as a storage module. Communication with the external device is preferably conducted via a communication channel such as a serial communication port.

Figure 6:
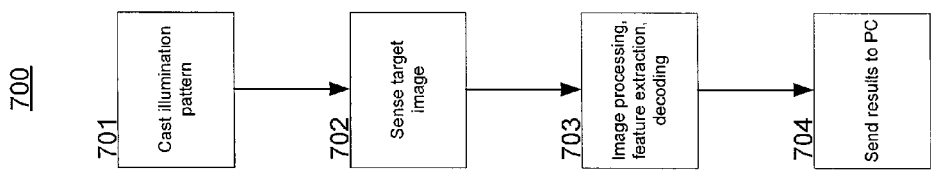
FIG. 6. shows a flow diagram of a 2D imaging data collection sensor with matching illuminator in accordance with the principles of this invention.

FIG. 6 shows a flow diagram 700, illustrating a method for 2D data collection with matching illuminator, in accordance with the present invention.

In step 701, an illumination pattern 110 is projected onto a target area by a 2D data collection imaging sensor 100 described above with references to FIGS. 1–5, such sensor having an array of light sources 103, and an array of reflectors 101, wherein the array of reflectors 101 reflects the light emanating from the array of light sources 103 to produce the illumination pattern 110.

In step 702, image sensor 102 senses light reflected back by the target area received at image sensor 102.

In step 703, the image sensed by the image sensor 102 undergoes image capture, processing, feature extraction, and decoding. Preferably, the foregoing steps, as well as all sensor-setting, are performed by a micro-controller, located on the sensor board 303, which houses the image sensor 102.

Preferably, as shown in step 704, the result of the image processing is sent to an external device, such as a PC, or to an internal module, such as a storage module.

Communication with the external device is preferably conducted over a communication channel such as a serial communication port.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

What is claimed is:

1. A 2D data collection sensor comprising:
an image sensor; and
an illumination module coupled to the image sensor, the illumination module comprising a plurality of reflectors that reflect lights of a light source and collectively generate a uniform illumination pattern with sharp edges both for illuminating a target data area and providing visual aiming assistance, wherein there is a distinct light source element per reflector, wherein each reflector comprises an opaque reflective surface with an aperture formed by the reflective surface, the light source emits light onto the reflective surface and through the aperture onto the target data area, wherein a curvature and shape of the reflective surface is curved for optimal uniformity and sharp edges of the illumination pattern, wherein each illumination pattern generated by each reflector matches all other illumination pattern generated by all other reflectors and collectively generate a uniform illumination pattern.

2. The apparatus in claim 1 wherein the uniform illumination pattern matches the field of view of the image sensor.

3. The apparatus in claim 1, wherein the light source comprises an LED.

4. A 2D data collection sensor comprising:
an image sensor; and
an illumination module coupled to the image sensor, the illumination module comprising a plurality of reflectors that reflect lights of a light source and collectively generate a uniform illumination pattern with sharp edges both for illuminating a target data area and providing visual aiming assistance, wherein there is a distinct light source element per reflector, wherein each reflector comprises a transparent solid with a reflective internal surface, light from the light source enters the solid, is reflected by the reflective surface and exits through the solid onto the target data area, wherein a curvature and a shape of the reflective surface is curved for optimal uniformity and sharp edges of the illumination pattern, wherein each illumination pattern generated by each reflector matches all other illumination pattern generated by all other reflectors and collectively generate a uniform illumination pattern.

5. The apparatus in claim 4 wherein the uniform illumination pattern matches the field of view of the image sensor.

6. A 2D imaging barcode reader comprising:
an image sensor; and
an illumination module coupled to the image sensor, the illumination module comprising a plurality of reflectors that reflect light of a light source and collectively generate a uniform illumination pattern with sharp edges both for illuminating a target data area and providing visual aiming assistance for a target barcode, wherein there is a distinct light source element per reflector, wherein each reflector comprises an opaque reflective surface with an aperture formed by the reflective surface, the light source emits light onto the reflective surface and through the aperture onto the target data area, wherein a curvature and shape of the reflective surface is curved for optimal uniformity and sharp edges of the illumination pattern, wherein each illumination pattern generated by each reflector matches all other illumination pattern generated by all other reflectors and collectively generate a uniform illumination pattern.

7. The apparatus in claim 6 wherein the uniform illumination pattern matches the field of view of the image sensor.

8. The apparatus in claim 6, wherein the light source comprises an LED.

9. A 2D imaging barcode reader comprising:
an image sensor; and
an illumination module coupled to the image sensor, the illumination module comprising a plurality of reflectors that reflect light of a light source and collectively generate a uniform illumination pattern with sharp edges both for illuminating a target data area and providing visual aiming assistance for a target barcode, wherein there is a distinct light source element per reflector, wherein each reflector comprises a transparent solid with a reflective internal surface, light from the light source enters the solid, is reflected by the reflective surface and exits through the solid onto the target data area, wherein a curvature and a shape of the reflective surface is curved for optimal uniformity and sharp edges of the illumination pattern, wherein each illumination pattern generated by each reflector matches all other illumination pattern generated by all other reflectors and collectively generate a uniform illumination pattern.

10. The apparatus in claim 9 wherein the uniform illumination pattern matches the field of view of the image sensor.

* * * * *

UNITED STATES PATENT AND TRADEMARK OFFICE
CERTIFICATE OF CORRECTION

| | |
|---|---|
| PATENT NO. | : 7,142,734 B1 |
| APPLICATION NO. | : 10/026094 |
| DATED | : November 28, 2006 |
| INVENTOR(S) | : Chen Feng |

It is certified that error appears in the above-identified patent and that said Letters Patent is hereby corrected as shown below:

Column 4,
Lines 11-12, remove "all other illumination pattern" and replace with -- all other illumination patterns --.

Column 4,
Lines 34-35, remove "all other illumination pattern" and replace with -- all other illumination patterns --.

Column 4,
Line 56, remove "all other illumination pattern" and replace with -- all other illumination patterns --.

Column 6,
Line 3, remove "all other illumination pattern" and replace with -- all other illumination patterns --.

Signed and Sealed this

Twenty-seventh Day of February, 2007

JON W. DUDAS
*Director of the United States Patent and Trademark Office*